2 Sheets—Sheet 1.

P. VAN ORDER.
Stone-Gatherer.

No. 211,069. Patented Dec. 17, 1878.

WITNESSES
L. Bacon
D. P. Cowl

INVENTOR
Peter Van Order
By his Attorneys
Wright & Luggett

2 Sheets—Sheet 2.

P. VAN ORDER.
Stone-Gatherer.

No. 211,069. Patented Dec. 17, 1878.

WITNESSES
L. Bacon
D. P. Cowl

By his Attorneys

INVENTOR
Peter Van Order
Wright & Suggett

N. PETERS, PHOTO-LITHOGRAPHER, WASHINGTON, D. C.

UNITED STATES PATENT OFFICE.

PETER VAN ORDER, OF CORTLAND VILLAGE, NEW YORK.

IMPROVEMENT IN STONE-GATHERERS.

Specification forming part of Letters Patent No. 211,069, dated December 17, 1878; application filed November 16, 1878.

*To all whom it may concern:*

Be it known that I, PETER VAN ORDER, of Cortland Village, in the county of Cortland and State of New York, have invented certain new and useful Improvements in Stone-Gathering Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is to make a machine which can be quickly and readily adjusted for the purpose of gathering up stone, and is adapted to horse-power.

My invention consists, mainly, in attaching to an axle-tree, by means of a loose joint, a scraper-box provided with a rake-toothed bottom and levers, by means of which said box is operated by the driver seated in a seat attached to said axle-tree or pole.

Figure 1:
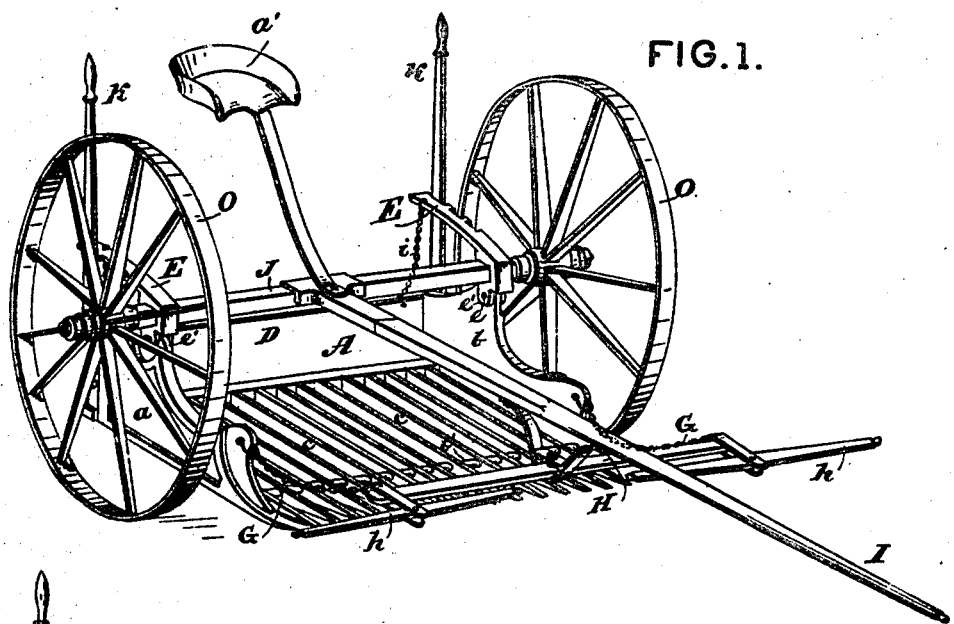
Figures 2, 3:
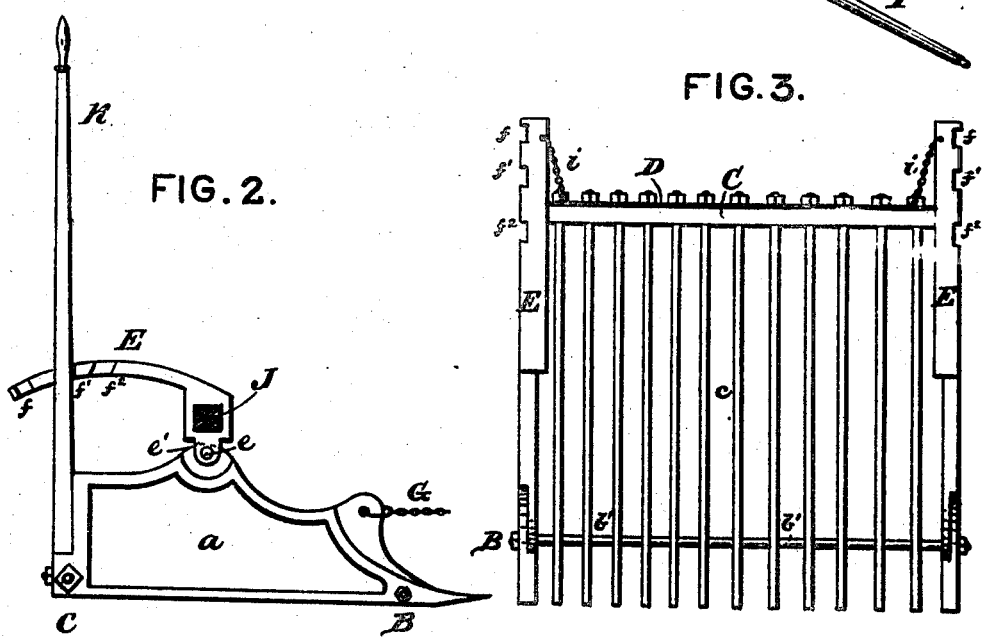
Figure 4:
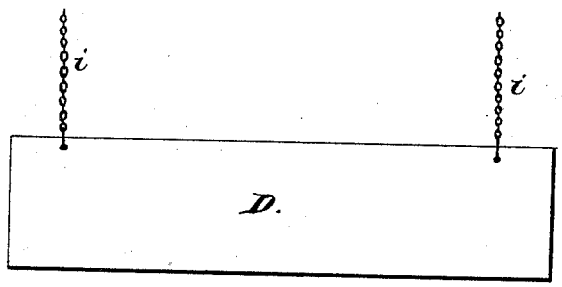
Figure 5:
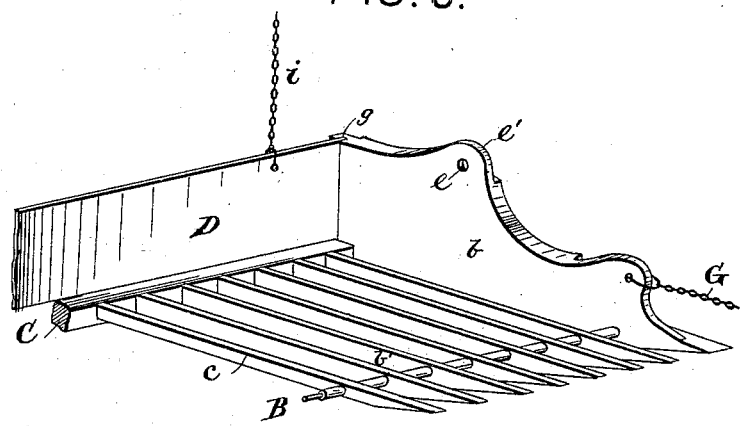

In the accompanying drawings, Figure 1 represents a perspective view of my invention; Fig. 2, a side view of the scraper-box and levers attached; Fig. 3, a plain top view of the scraper-box, showing the grated bottom and ratchet-arms; Fig. 4, a view of the tail-gate and its attachments; and Fig. 5, a perspective view of the scraper-box, showing the tail gate or board, and the shape of the teeth which constitute the bottom of the box.

The letter A represents a scraper or rake box, made with two sides, *a b*, alike in form, and a bottom composed of a series of strong metal teeth, *c*. The sides may be substantially constructed of any hard wood, bound with iron, or wholly of metal. The teeth *c* are placed parallel with the sides of the box, and with sufficient space between each tooth so as to allow the dirt which is collected with the stone to pass through between, but retain the stones; and the said teeth are secured in position by means of transverse rods B C, one of which, B, passes through the teeth near their front ends, and through the sides of the box, where it is held securely in position by means of screw-threaded nuts, thus clamping the whole together. Between the teeth, and on the rod B, are placed short metal tubes *b'*, for the purpose of keeping the teeth the required distance apart. The rod C is provided with a series of holes placed correspondingly to the rear ends of the teeth, through which the ends of the teeth pass, and the ends being screw-threaded, nuts are used, thus securing them in position. Placed on the axle-tree, near the wheels, are ratchet-arms E E, to the lower part of which, by means of bolts *e e*, passing through holes in the sides of the box and ears *e' e'* of the ratchet-arms, is pivoted the scraper-box, thus making a pivoted connection, by which the box is permitted to rise and fall at its front and rear ends at the will of the operator.

A tail gate or board, D, is placed in the rear end of the said scraper-box, and is held in position by the grooves *g g*, (shown in the sides of the scraper-box,) in which grooves the said tail-gate can rise and fall. Attached to the said tail-gate are two chains, *i i*, which are also fastened into the ratchet-arms E E. The said two chains are made of just such a length that when the scraper-box is in a position to carry the load they will just be taut; but when the scraper-box is thrown into position to be dumped, the rear end of the box will be depressed, allowing the contents to pass under the tail-board.

The upper part of the ratchet-arms E E extends rearwardly from the axle, and is provided with a series of notches, *f, f¹*, and *f²*, into which the levers K K are sprung in operating the scraper-box. The levers K K are securely fastened to the rear end of the scraper-box, and are operated by the driver seated in the seat *a'* when he desires to dump or replace the machine.

G G represent chains, which are attached at one end to the sides of the box, and at their other end to the evener H of the whiffletrees *h h*, the object of which is to cause a direct draw from the horses on the scraper-box, thus obviating the difficulties which would otherwise occur by the points of the teeth digging into the earth at too great a depth, thereby causing great strains upon the pivoted connection. The evener H is connected by suitable means directly to the tongue or pole I, which is rigidly secured to the axle-tree J, said axle-tree being provided with suitable wheels O O.

The operation of my invention will be readily understood in connection with the above description. The levers K K are brought forward and are sprung into the notches $f^2$, causing the teeth to rest upon the ground. The team is then started, the chains G G are drawn taut, and the operation of gathering stones is then commenced. When the box is full of stones, the dirt having passed through between the teeth, the levers K K are pushed back into the notches $f^1$, which action causes the box to assume a horizontal position, thus enabling the load of stone to be carried to the place required and there dumped, which is accomplished by pushing back the said levers into notches $f$. This action causes the rear end of the box to be depressed; at the same time elevating the front end leaves the tailgate raised, and the stone pass under and the load is dumped; and thus the operation goes on readily and easily, gathering and dumping stone as required for farming and other purposes.

It will be readily observed that a metallic bottom can be placed upon the teeth in the scraper-box, thus making a dirt-scraper or scoop of the machine, and operated in the same manner.

Having thus described the construction and operation of my invention, what I claim, and desire to secure by Letters Patent, is—

1. The combination of the pivoted scraper-box A, provided with levers K K, rigidly and directly attached to the said box, with the ratchet-arms E E, each provided with a series of notches, whereby said scraper-box may be thrown into position for gathering the stones, into position for transporting the stones, or into position for dumping the stones, as desired, substantially as specified.

2. The ratchet-arms E E, secured to the axle of the apparatus, in combination with the scraper-box pivoted to the lower part of the said ratchet-arms, substantially as herein specified.

PETER VAN ORDER.

Witnesses:
 W. H. SHANKLAND, Jr.,
 H. BALLARD.